July 6, 1971   B. BONNEL ET AL   3,591,542
QUICK-SETTING CEMENTITIOUS COMPOSITIONS
Filed May 26, 1967
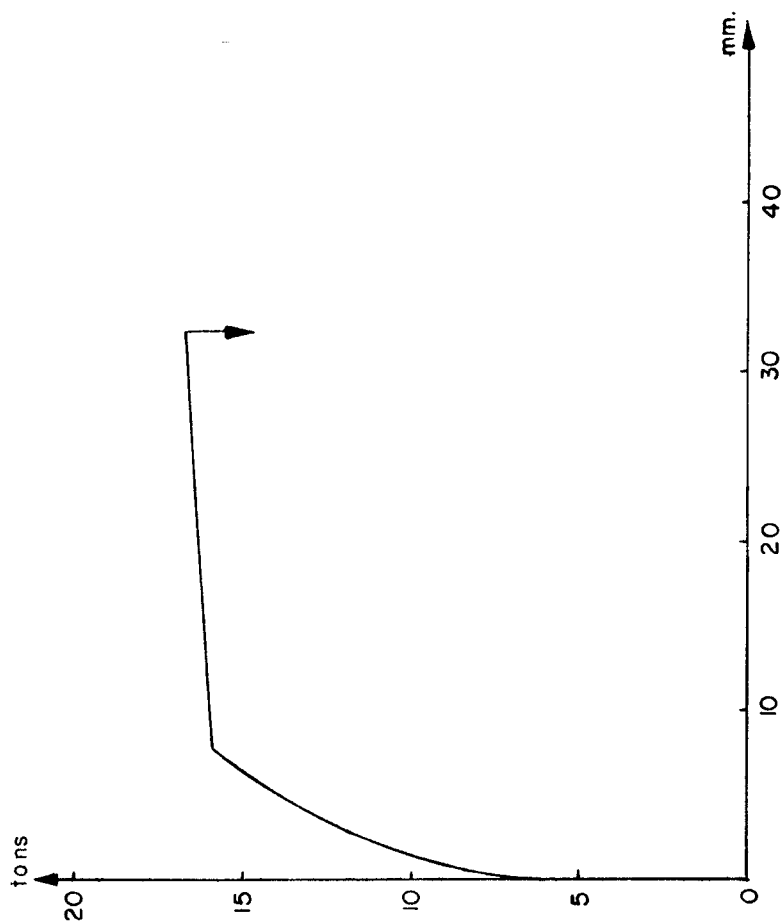
INVENTORS
Pierre Veromee
Bernard Bonnel
Pierre Allemand
BY Tourover & Broudy
ATTORNEYS United States Patent Office 3,591,542
Patented July 6, 1971

3,591,542
QUICK-SETTING CEMENTITIOUS COMPOSITIONS
Bernard Bonnel, Pierre Allemand, and Pierre Versmee, Lyon, France, assignors to Progil
Filed May 26, 1967, Ser. No. 641,695
Claims priority, application France, June 1, 1966, 47,351
Int. Cl. C08g 51/04, 51/24
U.S. Cl. 260—29.4           10 Claims

ABSTRACT OF THE DISCLOSURE

A quick-setting cementitious composition having exceptional resistance qualities including a quick setting hydraulic binder and the polymer formed in situ from an aqueous solution of acrylamide and formaldehyde and a polymerization catalyst; the polymer constituting 3–10% of the total weight of the final product.

---

The present invention relates to new cements and more particularly to cements including a quick-setting hydraulic binder and polymeric acrylic derivatives. It relates also to compositions of quick-setting mortar and concrete, having exceptional resistance qualities.

It is known to make quick-setting mortars using as a hydraulic binder, the commercial product known in France under the name of "ciment prompt" (quick-setting cement). The mortars obtained in this way have setting times varying between 2 and 5 minutes depending upon the proportion of the incorporated cement. However, though these quick-setting mortars acquire desirable mechanical qualities, their resistance to flexion, compression and especially traction does not reach a desirable level soon enough for many applications.

In other cases such mortars even after a long time do not have a high enough resistance to meet certain requirements.

Moreover, attempts have been made to modify the properties of known mortars made of various types of aggregates and hydraulic binders, by incorporating into these mixtures some adjuvants, especially polymeric or polymerizable in situ acrylic derivatives. For example, it has been proposed to substitute a liquid resin, such as an acrylic resin, for a part of the mixing water of mortars, in order to suppress the disadvantages due to the presence of a great quantity of water in the mixture.

Compounds, such as a partly hydrolyzed polyacrylamide or polyacrylic acid, which have the property, under certain conditions, of delaying mortar settings have also been used.

It has also been proposed to introduce into the aggregate and the hydraulic binder, copolymerizable mixtures of alkylidene bisacrylamide and of another ethylenic comonomer, associated with a polymerization catalytic system. This method is only applied when using slow-setting cements to quicken the setting time. An increase of compression resistance has been noted after 28 days, but this increase does not exceed 50% with respect to the resistance obtained with a similar mortar without the added acrylic mixture.

There has also been described recently a method of modifying hydraulic binders by incorporation therein of polyvalent metal salts of methacrylic and acrylic acids, possibly associated with a polymerization catalyst. According to the proportion of acrylic salt added to cement, the proportion which may reach 1.5 times the weight of the cement, hard or plastic mortars are obtained. As in the previously cited case, this treatment is applied to slow-setting hydraulic binders to reduce appreciably the hardening and setting times. However the resistances of the mortars obtained remain of the same order as the ones of classical mortars.

On the contrary, applicants have now found that starting with a quick-setting hydraulic binder, it is possible by treatment with specific mixtures based on organic acrylic derivatives simultaneously to give to the final products greatly improved properties.

Thus, the new compositions according to the present invention yield mortars which have both the advantages of a quick-setting time as well as considerable mechanical resistances and to obtain these resistances in a very short time with respect to the prior compositions.

Moreover, these compositions have the advantage of adhering very well to the surfaces on which they may be applied, such as wood, metals, plastics, building materials, etc.

Finally, the process of preparation of the compositions according to the present invention is very easy to use.

In its most general form the invention relates to compositions of cements, mortars and concretes obtained from the following constituents:

A quick-setting hydraulic binder,
An aqueous solution of a mixture of acrylamide monomer and formaldehyde, and
A polymerization catalytic system for the acrylic mixture.

There may also be added to such basic compositions a filler of known type such as sand, gravel, clay or mixtures of these, a regulating agent of cement setting, such as for example calcium sulfate, and possibly a supplementary proportion of water.

The hydraulic binder known as a quick-setting cement usable according to the invention does not need special characteristics. Commercial products may be used under the normal conditions as described by the manufacturers. These cements set in 2–5 minutes, and contain tricalcium aluminate which is important in the rapid setting.

A particularly suitable quick-setting cement is sold in France under the name "Ciment Prompt Vicat" manufactured by Societe des Ciments Vicat. This cement is obtained by calcinating at 900–1000° C. a natural argillaceous limestone found in the Alps. This product has a pale yellow color and an apparent density of about 750 g./l.

The composition and the grain size of the filler are chosen with regard to the use contemplated for the final mortar. Its characteristics have no effect on the properties of the compositions according to the invention. It is only necessary to use a filler free from moisture, as the presence of water can have an influence on the hydraulic binder before mortar preparation.

The aqueous solution of acrylamide monomer and formaldehyde mixture may contain any proportion of dry extract; however in order to avoid the handling of a liquid which is too fluid or too viscous, it is proposed to use a solution containing 30 to 60% of dry extract.

The acrylamide and formaldehyde mixture, by itself, is obtained by contacting an acrylamide aqueous solution and a formaldehyde aqueous solution at a temperature from 20 to 70° C. in the presence of a basic catalyst, as, for example, sodium carbonate or a sodium hydroxide aqueous solution. It is possible to react in this way 0.5 to 1.5 moles of formaldehyde to each mole of acrylamide.

The catalyst used in the compositions according to the invention may be chosen from known polymerization catalysts, such as organic peroxides, as benzoylperoxide, persalts, as potassium persulfate, redox systems (for example chloric acid-alkali metal bisulfite) possibly along with organic or inorganic acids or with water soluble alkaline agents such as hydroxides or carbonates. According to a preferred form of the invention a solid water-soluble catalyst is used or a catalytic combination of two constituents, one of which is solid and the other liquid, as, for example, an alkali metal persulfate activated by means of a liquid dialkylaminopropionitrile.

The compositions according to the invention are obtained at the time of use by contacting two mixtures, one in powder form and the other one in liquid form.

The pulverulent mixture contains the quick-setting cement, the filler, and possibly a regulating agent for cement setting and the catalyst or the solid catalytic constituent for the polymerization of the acrylic mixture.

The liquid composition contains the aqueous solution of acrylamide and formaldehyde mixture, brought to the desired dilution by means of an additional quantity of water, as well as the catalytic liquid constituent for polymerization.

Each of the mixtures prepared in this way may be kept separately before using for a period of time up to several months, under normal conditions, that is in an essentially dry atmosphere for powder. On the other hand it is, of course, imperative that the liquid composition does not contain all of the catalytic system for inducing the polymerization of acrylamide and formaldehyde in the stored mixture.

The respective ratios of the constituents may vary within large limits to yield the qualities desired for the final mortar.

In general, an acrylamide and formaldehyde mixture quantity corresponding to a polymer proportion of between 3 and 10% of the total weight of the final product, yielded a series of mortars usable in a very large range of applications. Less than 3% of the mixture resulted in a practically negligible improvement in the mechanical qualities of the composition as compared to known mortars. Above 10% of the mixture resulted in resistance numbers in the products so high that the use of such mortars is justified only in very rare cases.

Moreover, research has shown that for the other ingredients comprising the compositions according to the invention better results were obtained with the following percentages:

In the pulverulent mixture, the proportion of the hydraulic binder in weight may be between 50 and 90%, without taking into account the polymerization catalyst, the complement to 100% comprising the filler, alone or added with the cement setting regulating agent; the latter may represent, for example, 2 to 4% of the powder weight.

The quantity of water which may be added to the aqueous solution of formaldehyde and acrylamide mixture depends upon the initial concentration of this solution and upon the percentage of the desired polymerized product in the final mortar. It can be easily determined with regard to these variables.

The proportion of the liquid to be used with regard to the pulverulent mixture may also vary. However, better results are obtained when the quantity of liquid is between 0.25 and 0.65 part by weight per part of powder, which represents about 20 to 40% of the total weight of the mortar.

The quantity of the catalyst to be introduced into the compositions according to the invention may vary between 0.1 and 3% with regard to the final mortar total weight. This may be a solid catalyst, for example a persalt which is added to the powder. It is also possible to partially replace the latter in a proportion of up to 1% of final product total weight by an activating agent such as diethylaminopropionitrile, which is mixed with the liquid. This compound has a polymerization catalytic action only in the presence of persalt and does not induce any modification of the formaldehyde and acrylamide mixture during storage. The quantity of catalyst may be varied within the above indicated limits in order to regulate mortar setting time.

The preparation of the composition according to the invention is extremely simple. It consists in introducing the liquid into the pulverulent product in convenient proportions at the time of use and in mixing these constituents, preferably with intense stirring, until a homogeneous paste is obtained. This paste is extremely easy to handle before mass-setting. The only factor which must be taken into consideration during use is the temperature of the reagents. Preferably they are maintained at a temperature of between 10 and 25° C. Under 10° C. the mixture does not set anymore in mass whereas above 25° C. the setting time becomes too short to use the compositions in a convenient manner.

The various reactions which take place when contacting the powder and liquid, namely hydration, then hardening of the hydraulic binder and polymerization of the formaldehyde and acrylamide mixture, have a favorable action upon one another. The hydration of the quick-setting cement induces a slight increase of temperature, which gives rise to acrylic mixture polymerization, and this reaction being strongly exothermic, quickens cement hardening. Though the whole of the reactional mechanism has not been studied in all its complexity, it is likely that it is this reciprocal action which results in mortar compositions reaching resistances which have never been able to be obtained so quickly until now.

The applications of the compositions according to the invention are numerous, because of the qualities presented by these compositions. They may be used advantageously for the instantaneous sticking of various pieces, especially concrete pieces or for joint making. With these compositions may be made thin covers and ground coatings hardening very quickly, bricks, tiles, floors, possibly colored by pigment addition, which do not need any heating and are usable almost immediately. These compositions also permit making building elements intended to support strong resistances, especially in traction. An application giving especially good results is the use of mortars according to the invention in sealing operations, especially in the sealing of anchor rods used in mine ground supporting. These compositions may also be used for the repair of cracks and fissures, consolidation of soils, etc.

All these applications are accomplished in the same way as in the case of known mortars, that is by injection, molding, and framing of the paste prepared under the previously indicated conditions.

The examples hereinafter given in a non-limitative way are to clarify the exceptional qualities of the compositions according to the invention.

EXAMPLE 1

The following two formulations which had been stored at 20° C. were used:

PULVERULENT FORMULA

| | G. |
|---|---|
| Quick-setting cement (Ciment Prompt Vicat) | 320 |
| Dry Fontainebleau sand | 70 |
| Calcium sulfate ($CaSO_4 \cdot 2H_2O$) | 10 |
| Ammonium persulfate | 2 |

LIQUID FORMULA

| | G. |
|---|---|
| Aqueous solution of formaldehyde and monomeric acrylamide with 44% of dry extract | 94 |
| Additional water | 20 |
| Diethylaminopropionitrile | 0.2 |

A mortar paste was prepared by pouring the liquid all at one time into the powder and by stirring intensely for some seconds. The paste was molded in the test-tubes described in AFNOR P 15.301 norm and traction tests were made according to norm prescriptions. The results obtained are reproduced in the Table I hereinafter.

Setting time measured by means of Vicat needle, according to AFNOR P 15.431 norm was 4 minutes.

The measurement time in the tables refers to the elapsed time between the preparation of the test samples and the time when the tests are effected.

TABLE I

| Measurement time: Minutes: | Traction resistance in kg./cm.$^2$ |
|---|---|
| 5 | 12 |
| 15 | 26 |
| 30 | 44 |
| 50 | 50 |
| Hours: | |
| 1 | 52 |
| 24 | 62 |
| 7 days | 90 |

As a comparison it should be noted that a mortar with 40% of quick-setting cement, free of the acrylic mixture, has a traction resistance at the end of 28 days reaching hardly 20 kg./cm.$^2$. In the same time a resistance number of 35 kg./cm.$^2$ has been noted for a normal mortar with "Supercement" (Hydraulic binder defined by AFNOR P 15.302 norm).

EXAMPLE 2

Under the same conditions as in Example 1 there was prepared mortar samples as described above, from a paste obtained by mixing the following two formulations which had been stored at 15° C.

PULVERULENT FORMULA

| | G. |
|---|---|
| Quick-setting cement (Ciment Prompt Vicat) | 330 |
| Dry Fontainebleau sand | 70 |
| Calcium sulfate CaSO$_4$·2H$_2$O | 15 |
| Ammonium persulfate | 2 |

LIQUID FORMULA

| | G. |
|---|---|
| Aqueous solution of formaldehyde and monomeric acrylamide with 50% of dry extract | 86 |
| Additional water | 36 |
| Diethylaminopropionitrile | 1 |

Setting time, measured under the same conditions as in Example 1, was 5 minutes.

Flexion and compression resistance tests were conducted according to the AFNOR P 15.451 norm. The results obtained are reproduced respectively in the Tables II and III hereinafter.

As a comparison we give resistance numbers obtained with a mortar containing 40% by weight of quick setting cement, 40% by weight of sand and 20% of water, this proportion of cement giving always the strongest resistances.

TABLE II

| Measurement time | Mortar according to the invention, kg./cm.$^2$ | Mortar with quick cement only, kg./cm.$^2$ |
|---|---|---|
| Minutes: | | |
| 15 | 50 | 12 |
| 30 | 68 | 15 |
| Hours: | | |
| 1 | 75 | 17 |
| 24 | 86 | 23 |
| 7 days | 138 | |

TABLE III

| Measurement time | Mortar according to the invention, kg./cm.$^2$ | Mortar with quick cement only, kg./cm.$^2$ |
|---|---|---|
| Minutes: | | |
| 15 | 80 | 60 |
| 30 | 100 | 70 |
| Hours: | | |
| 1 | 138 | 80 |
| 24 | 205 | 100 |
| 7 days | 288 | 150 |

As may be seen from the tables, from the 15th minute after their preparation, the mortars according to the invention have a resistance greater by 25% than that of mortars with quick cement only; at the end of one hour the increase is 70%, and at the end of 24 hours it is more than 100%.

EXAMPLE 3

This example is intended to illustrate one of the applications of the compositions according to the invention, that is, the sealing in bolting operations for mine supporting. It is known that, in order to avoid subterranean crumbling, anchor-rods are introduced into the rocks, the anchor-rods having screws placed at the ends thereof. This operation is called "bolting." To be efficient it is necessary for the rods to remain at their right place in spite of the high restraints to which they are subjected. For this they must be sealed in the rock by a mortar which has at the same time very short hardening and setting times and very strong resistances.

Tests were conducted involving the drawing out of rods sealed by the mortar described in Example 1. For this, the anchor hole has been simulated by a steel tube 1.30 m. long and of a diameter of 40 mm. Mortar was injected into this hole by means of compressed air and the rod to be sealed was immediately driven into it. The rod was a twisted rod of square section and 1.70 m. long. Sealing resistance was tested at the end of an hour after mortar preparation. The test consisted in pulling the rod by means of a jack, linked to a pump giving pressure numbers permitting the determination of the pull required. The sliding and lengthening of the rod have been measured by means of a comparator graduated into 1/1000 mm. The results are reproduced on the attached drawing.

On this figure there is shown on the $x$-axis the length of rod sliding and lengthening expressed in mm., and on the $y$-axis, the pull expressed in tons. The descending arrow indicates rod breaking.

As may be seen, the sealing made with a mortar according to the invention resists extremely high pulls, whereas at a load of 16 tons, the rod breaks without the sealing itself being drawn out.

It will be obvious to those skilled in the art that various changes may be made without departing from the scope of the invention and the invention is not to be considered limited to what is shown in the drawing and described in the specification.

What is claimed is:

1. A new composition of matter consisting essentially of (1) a quick-setting cement of the tricalcium aluminate type normally having a setting time on the order of 2–5 minutes and obtained by calcination of a natural argillaceous limestone at about 900–1000° C. and (2) 3–10% by weight of a polymer of acrylamide and formaldehyde, said polymer being obtained in situ by starting with an aqueous solution of one mole of acrylamide for 0.5–1.5 moles of formaldehyde and containing 30–60% by weight of dry extract and in the presence of 0.1–3% of the total weight of the said composition of a catalyst selected from the group consisting of an organic peroxide, a redox catalyst, and a persalt.

2. A composition according to claim 1 which further includes sand, gravel, or clay filler.

3. A composition according to claim 1 which further includes an agent for regulating the setting of the hydraulic binder.

4. A composition according to claim 3 wherein said agent is calcium sulfate.

5. A composition according to claim 1 wherein said composition is a mixture of a liquid fraction and a solid fraction adapted to be admixed at the time of use, said liquid fraction being introduced at the rate of 0.25–0.65 part by weight per part of said solid fraction, and wherein said liquid fraction comprises said aqueous solution of acrylamide and formaldehyde containing 30–60% by weight of dry product of the reaction between about 0.5–1.5 moles of formaldehyde and 1 mole of acrylamide.

6. A composition in accordance with claim 1 wherein said catalyst comprises a persalt activated by a dialkylaminopropionitrile.

7. A composition in accordance with claim 5 further including sand, gravel or clay filler.

8. A composition in accordance with claim 5 further including an agent for regulating the setting of said cement.

9. A composition according to claim 6 wherein said dialkylaminopropionitrile comprises diethylaminopropionitrile.

10. A composition according to claim 9 wherein said solid portion is a pulverulent mixture of a quick setting cement which sets in 2–5 minutes, sand, calcium, sulfate and ammonium persulfate.

References Cited
UNITED STATES PATENTS

| | | | |
|---|---|---|---|
| 2,594,280 | 4/1952 | Beaudet | 260—39 |
| 2,801,983 | 8/1957 | Dixon et al. | 260—39 |
| 2,868,753 | 1/1959 | Morgan et al. | 260—29.6S |
| 2,962,458 | 11/1960 | Bird et al. | 260—29.6S |
| 3,240,736 | 3/1966 | Beckwith | 260—39 |
| 3,437,625 | 4/1969 | Bonnel et al. | 260—29.4U |

JOHN C. BLEUTGE, Primary Examiner

U.S. Cl. X.R.

166—293; 252—8.55; 260—29.6, 39, 41; 299—11